Jan. 24, 1967  J. RAGOLIO  3,300,184
COMBINATION JACK AND TIRE BREAKER
Filed Oct. 23, 1965
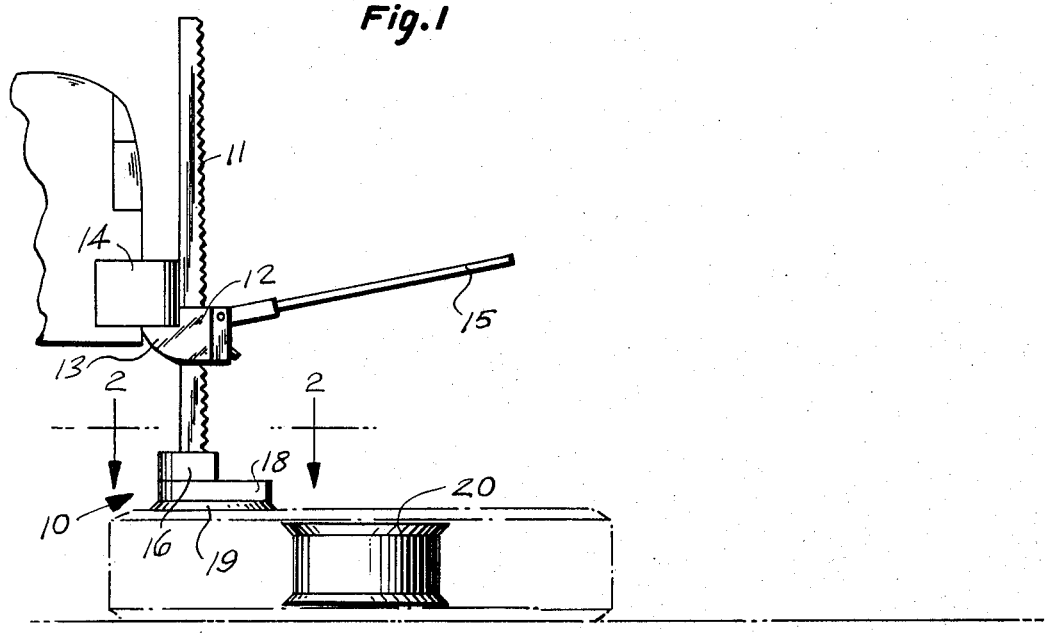
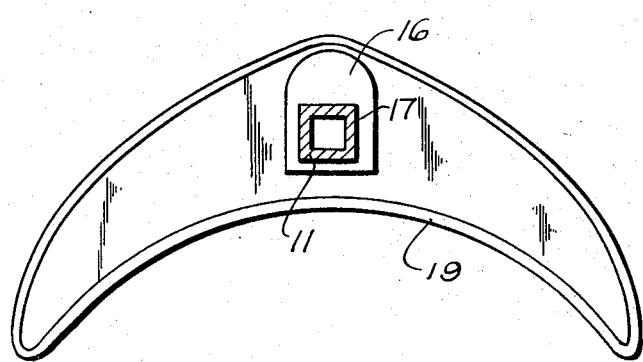
INVENTOR.
*John Ragolio*

United States Patent Office 3,300,184
Patented Jan. 24, 1967

3,300,184
COMBINATION JACK AND TIRE BREAKER
John Ragolio, 818 Bengies Road, Baltimore, Md. 21220
Filed Oct. 23, 1965, Ser. No. 503,103
1 Claim. (Cl. 254—133)

This invention relates to various tire tools and more particularly to a combination jack and tire breaker.

The present invention involves a novel advance in the prior art of providing a combination jack and tire breaker for motor vehicles which can either be used to depress the lip portion of the bead of a tire that is engaged by the rim of the automobile wheel, or in the alternative used simply as a jacking mechanism for raising an automobile from the ground when the base portion is positioned on the ground.

It has not been known heretofore to provide a combination tool capable of either raising a car from the ground or for breaking the peripheral bead of an automobile vehicle wheel from the rim thereof.

Accordingly, it is the principal object of the present invention to provide a jack mechanism which is adapted to move in a vertical plane on a conventional-type jack post with the usual means being provided on the jack mechanism for engaging the bumper of a motor vehicle. The improved jack, in this instance, is provided adjacent to its lower extremity with a supporting base which includes a dependent collar portion with the lower extremity of the jack post arranged to be received in the dependent collar. Associated with the collar portion, carried by the jack post, there is provided an arcuate ring-shaped combination tire bead breaking member and jack base. As will be observed later herein, the arcuate ring-shaped member has a lower planar surface removably supporting the collar and the jack post. The arcuate ring-shaped combination tire bead breaking member and jack base further includes a curvilinear area provided with a lip portion which is adapted to be positioned between the rim of an automobile wheel and the peripheral edge of an automobile tire so that upon the usual motion being transmitted to the jack mechanism and therethrough into the bumper or other body portion of the motor vehicle, the tire will be broken away from the rim of the wheel.

It is therefore the main purpose of this invention to provide a combination jack and tire breaker which can be used for loosening pneumatic tire casings from the wheel rims and to raise the motor vehicles.

Another object of this invention is to provide a combination jack and tire breaker which are integrally connected to each other.

Another object of this invention is to provide a combination jack and tire breaker which is of simple and practical construction and provides maximum utility to the motorist.

A still further object of this invention is to provide a combination jack and tire breaker which is relatively inexpensive to manufacture and otherwise well adapted for the purpose for which the jack and tire breaker is intended.

Other objects and advantages of the invention will become apparent from a consideration of the following detailed description taken in connection with the accompanying drawing wherein a satisfactory embodiment of the invention is shown.. However, it is to be understood that the invention is not limited to the details disclosed but includes all such variations and modifications as fall within the spirit of the invention and the scope of the appended claim.

In the drawing:

FIGURE 1 is an elevated side view of this invention.

FIGURE 2 is a top plan view taken along the lines 2—2 of FIGURE 1.

According to this invention, a combination jack and tire breaker 10 is provided with an upright jack post 11. The bottom portion of this jack post is removably secured within aperture 17 of semi-circular upper support 16. One side of jack post 11 is provided with rack teeth extending from top to bottom of said jack post. Jack mechanism 12 is movably supported on jack post 11 and includes support 13 which is adapted for positioning underneath the bumper of a motor vehicle. Handle 15 is pivotably connected to jack mechanism 12 and is instrumental in raising or lowering bumper 14 of a motor vehicle. Upper support 16 is secured on base member 18 which is of semi-circular configuration. Outwardly extending lip portion 19 is secured to the bottom of base member 18 and is adapted to be inserted under the rim 20 of the metallic wheel portion.

Looking now at the drawing, one will see that in order to facilitate the removal of the pneumatic tire from the wheel, lip portion 19 of base member 18 is inserted under the rim 20 and when this is done, the pneumatic tire can be taken off the wheel with tire irons (not shown). Tool 10 may then be released and tire turned over on the other side, and the same process repeated, completely separating both beads from the rim 20 of the wheel. In addition, if it is desired to lift the bumper of a motor vehicle, jack post 11 can be removed from upper support 16 or said jack post can be maintained on base member 18 thus base member 18 providing the bottom support for the jack post 11.

It will also be noted that this type of arrangement serves a dual purpose, that is, the combination jack and tire breaker can be used for removing pneumatic tires and for raising the motor vehicles off the ground.

Also, it should be noted that, if necessary, jack post can be separated from tire breaker.

What I now claim is:

A combination jack and tire breaker for motor vehicles comprising an upright jack post, a jack mechanism adapted to move vertically on said jack post, means on said jack mechanism for engaging the bumper of said motor vehicle, said jack being provided adjacent to its lower extremity with a supporting base provided with a dependent collar, the lower extremity of said jack post being arranged to project into the collar, an arcuate wing-shaped combination tire bead breaking member and jack base having a lower planar face removably supporting said collar and said jack post, said arcuate wing-shaped combination tire bead breaking member and jack base further including a curvilinear area provided with a lip portion adapted to be positioned between the rim of an automobile wheel and the peripheral edge of said tire so that when motion is transmitted to the jack mechanism and therethrough into the bumper of the motor vehicle, the tire will be broken away from the rim of the automobile wheel.

References Cited by the Examiner

UNITED STATES PATENTS 2,616,650   11/1952   Thompson.

FOREIGN PATENTS 552,508   2/1958   Canada.

WILLIAM FELDMAN, Primary Examiner.

OTHELL M. SIMPSON, Examiner.